Patented Feb. 24, 1925.

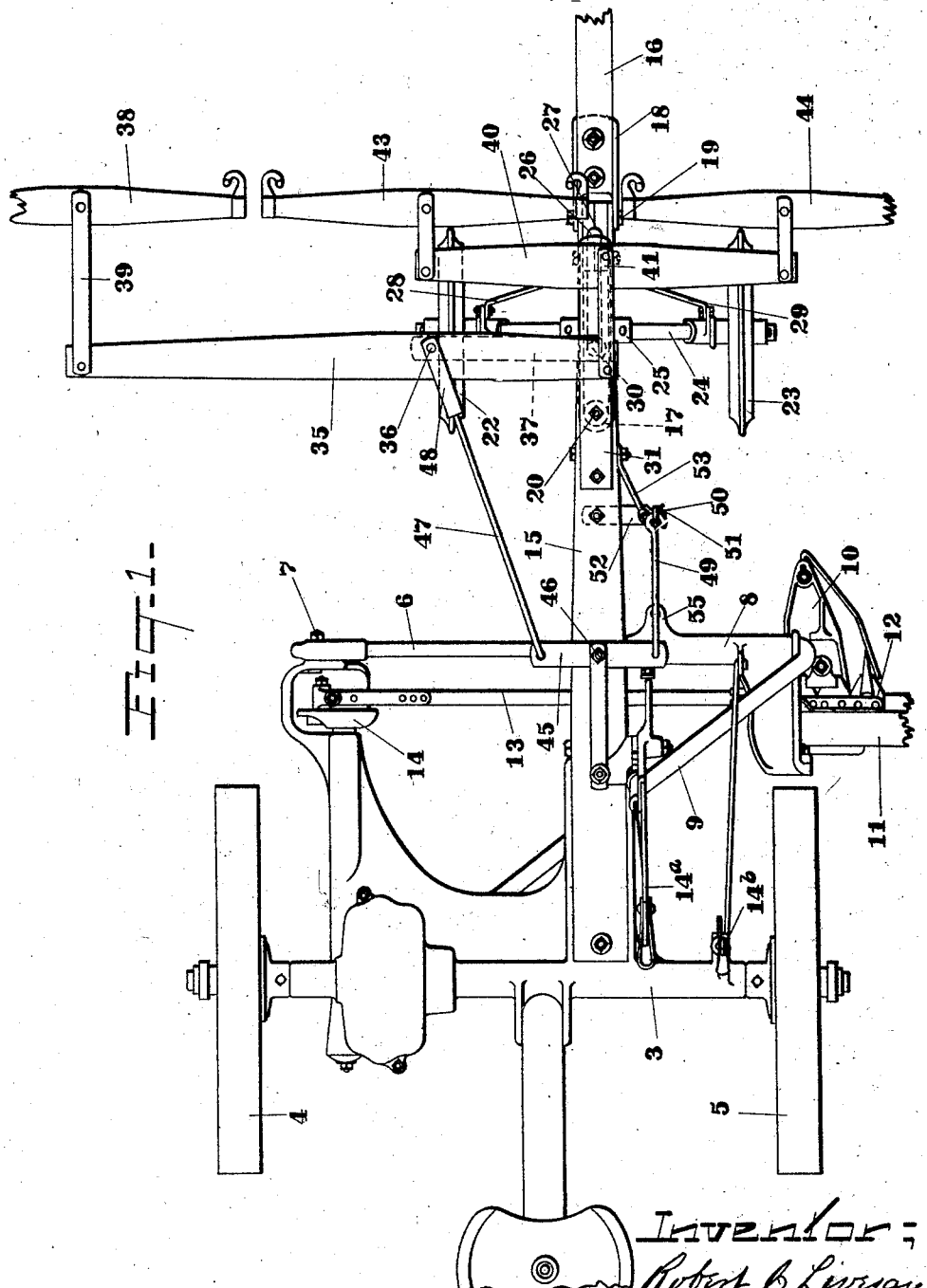

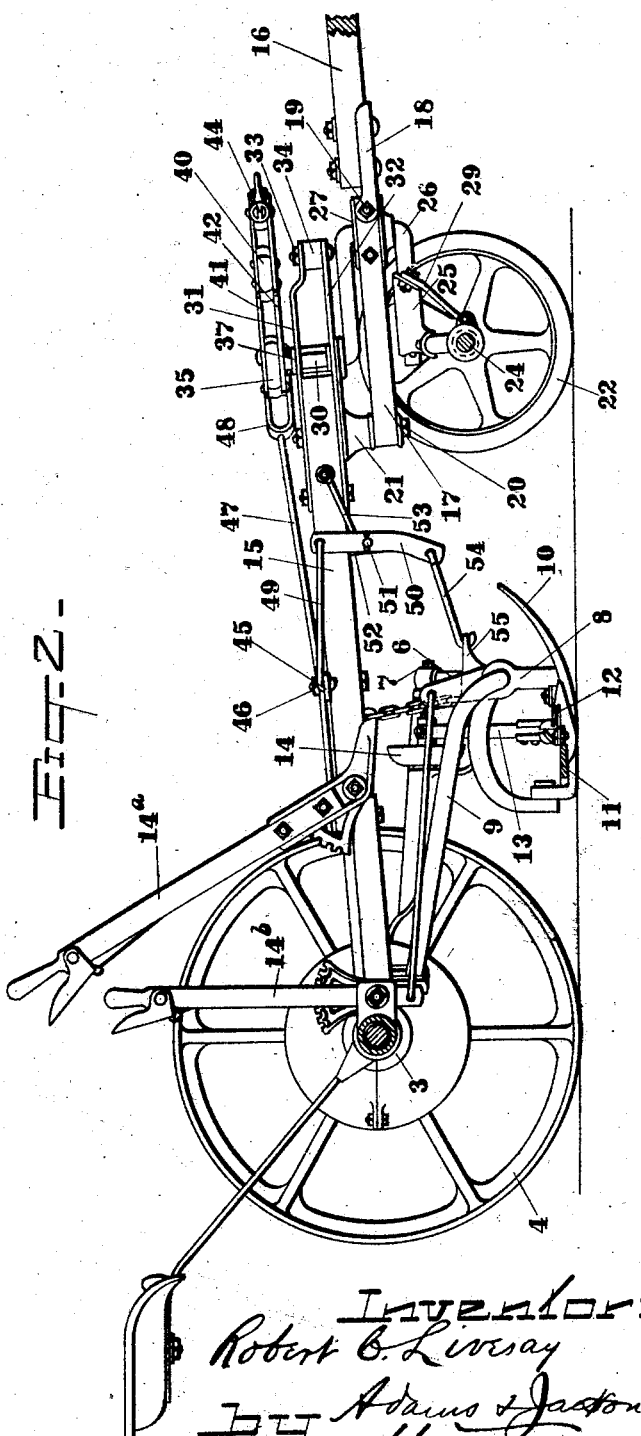

1,527,566

UNITED STATES PATENT OFFICE.

ROBERT C. LIVESAY, OF MOLINE, ILLINOIS, ASSIGNOR TO DEERE & COMPANY, OF MOLINE, ILLINOIS, A CORPORATION OF ILLINOIS.

MOWER.

Application filed October 23, 1919. Serial No. 332,765.

*To all whom it may concern:*

Be it known that I, ROBERT C. LIVESAY, a citizen of the United States, and a resident of Moline, in the county of Rock Island and State of Illinois, have invented certain new and useful Improvements in Mowers, of which the following is a specification, reference being had to the accompanying drawings.

My invention relates to harvesting machinery, such as mowers, and particularly to mowers and like implements arranged to be drawn by three horses and equipped with draft devices by which the draft animals travel in the stubble. It has for its object to improve the construction of mowers of that type with respect to the draft and steering devices so that the draft of the team will be divided between the main and coupling frames of the mower, the team will be relieved from downward neck pressure, and the objectionable side draft resulting from the unbalanced position of the grass or grain cutting devices and the necessary offset position of the draft devices will be substantially neutralized so that the mower may easily be steered. I accomplish my object as illustrated in the drawings and as hereinafter described. What I regard as new will be set forth in the claims.

In the accompanying drawings,—

Fig. 1 is a plan view of the principal parts of a mower embodying my improvements, part of the finger bar being omitted; and Fig. 2 is a side elevation of the mower, some parts being in section.

Referring to the drawings,—3 indicates the main frame of the mower which is provided with the usual wheels 4—5. The coupling frame of the mower comprises the usual drag bar 6 pivotally connected with one end of the main frame by a pivot 7. The opposite end of the drag bar is connected with a shoe bracket 8 which is pivotally mounted thereon so as to rock about a transverse axis, and is also pivotally connected with the forward end of a diagonal thrust bar 9, the rear end of which is pivotally connected with the main frame, so that the shoe bracket 8 may rise and fall. 10 indicates the usual inner shoe which is connected with the shoe bracket 8 so as to rock therewith, and is also pivoted so that it may turn about a longitudinal axis. 11 indicates the usual finger bar, and 12 the cutter bar. 13 indicates the pitman for reciprocating the cutter bar 12, said pitman being operated by a crank disc 14 in the usual way. Pivoted hand-levers 14$^a$ and 14$^b$ are provided which are connected in any usual manner with the coupling frame, and are adapted, respectively, for raising and lowering the coupling frame and for rocking the shoe bracket. It is unnecessary to describe in detail the operating parts of the mower mechanism, as they may be of any approved construction, such, for example, as that shown in Letters Patent No. 1,147,708, granted July 27, 1915, to Joseph Dain.

The tongue of the mower is made in three sections, the rear section or stub tongue 15 being rigidly secured to the main frame 3, as shown in the drawings. The front section 16 of the tongue is connected at its rear end to an intermediate tongue section 17 by a hinge 18 pivoted to the forward end of the intermediate section 17 by a pivot 19, as shown in Fig. 2. The front tongue section 16 may be swung vertically with relation to the tongue section 17, but it is held against swinging laterally with relation thereto by the hinge 18 which is channeled to receive the tongue section 16, as shown in Fig. 2. The intermediate section 17 is pivotally connected with the under side of the forward portion of the rear section or stub tongue 15 by a pivot 20 which extends through said tongue sections and through a spacing sleeve 21 interposed between the tongue sections 15—17. 22—23 indicate guide wheels having rims adapted to penetrate the soil to some extent, said rims being preferably V-shaped, as shown in Fig. 1. The wheels 22—23 are mounted upon an arched axle 24, the central portion of which is connected by a sleeve 25 with the lower arm of a crank 26, the intermediate portion of which is journaled by a slotted connection in the forward portion of the intermediate tongue section 17, as shown at 27 in Fig. 2. The end portions of the arched axle 24 are braced to the lower arm of the crank 26 by braces 28—29, as shown in the drawings. The upper arm of the crank 26 extends back over the lower arm thereof, and has its end bent upward at right angles, as shown at 30 in Fig. 2, to form a journal which is mounted in a suitable bearing carried by the stub tongue 15. Preferably this bearing is provided by upper and lower straps 31—32 which extend forward from the rear tongue section 15, as shown in Fig. 2, and are connected at their forward ends by a bolt 33 which passes through a spacer block 34. By this construction, the forward end of the stub tongue and the draft devices are supported by a truck steered by the team, as when the front tongue section 16 is swung laterally in either direction, the intermediate tongue section 17 swings with it, and by reason of its connection with the crank 26, the axle 24 is swung in a corresponding direction, thereby turning the wheels 22—23 accordingly to steer the implement. By means of the crank 26, a considerable leverage is obtained to aid in turning the wheels so that the machine steers easily.

The draft devices comprise the following mechanism: 35 indicates a transversely-disposed draft bar which is pivotally mounted between its ends by means of a pivot 36 upon the upper side of a transversely-arranged supporting bar 37 which projects at the opposite side of the stub tongue 15 from the finger bar, and is pivotally connected at its inner end with the stub tongue so that it may swing longitudinally, i. e., forward and backward. This is best accomplished by extending the journal 30 of the crank 26 up above the strap 31 and mounting the bar 37 upon it, as shown in Fig. 2. The draft bar 35 and bar 37 are therefore positioned in a horizontal plane above the stub tongue. 38 indicates a single-tree connected in any suitable way, as by a strap 39, with the outer end of the draft bar 35, as shown in Fig. 1. 40 indicates a whiffle-tree which is connected by straps 41—42 with the opposite end portion of the draft bar 35 and extends across the upper side of the stub tongue. The whiffle-tree 40 carries the usual single-trees 43—44. 45 indicates a transversely-disposed distributer bar which is pivotally mounted upon the upper side of the rear tongue section 15 by a pivot 46, as shown in Fig. 1. One end of the bar 45 is adjustably connected by a rod 47 with a yoke 48 connected with the pivot 36, so that draft applied to the draft bar 35 is transmitted to the distributer bar 45. 49 indicates a link which connects the opposite end of the distributer bar 45 with a vertically-disposed lever 50 which is mounted on a pivot 51 carried by a suitable bracket 52 depending from the rear tongue section 15. Said bracket is braced by a brace 53 so that it is held rigidly in position. The lower arm of the lever 50 is connected by a link 54 with an ear 55 carried by the shoe bracket 8, as shown in Fig. 2.

By the construction described, the draft of the team is equalized and transmitted to the pivot 46 of the distributer bar 45 by the rod 47, and is distributed by said bar 45 between the main frame and the coupling frame adjacent to the inner shoe 10. A portion of the draft tends to draw the inner shoe 10 and the finger bar, and the remainder is employed in propelling the implement.

By placing the draft devices in a horizontal plane above the stub tongue it is made practicable to place the tongue truck far enough back so that it does not interfere with the horses in turning while at the same time it serves as a support for the downward pressure resulting from the higher location of the draft devices and relieves the horses of neck weight. The truck also overcomes side draft by reason of the engagement of its wheels with the soil, and, therefore, the horses are relieved of that burden so that the steering of the implement is easier and requires less attention. Furthermore, it will be noted that the draft connections with the main and coupling frames are located between the tongue truck and the supporting wheels 4, 5 by which arrangement the power of the draft does not tend to reduce the traction of said supporting wheels, which would be objectionable as it would interfere with the operation of the cutter or sickle bar. In turning, the front tongue section is swung in the proper direction by the team, thereby turning the wheels 22—23 in a corresponding direction. This does not change the position of the rear tongue section or in any way affect the draft devices, which continue to operate in the manner previously described. I do not herein claim broadly the construction of the three-horse equalizer and its connections with the main and coupling frames of the mower, as that is the subject-matter of another application filed by me of even date herewith. This application is directed more particularly to an arrangement and combination of such improved three-horse equalizing devices with a mower provided with means for steering it and overcoming or substantially neutralizing side draft, such that the operation of the equalizing devices is not interfered with, or adversely affected by the operation of the implement.

What I claim as my invention and desire to secure by Letters Patent, is—

1. The combination with a mower comprising a main frame, supporting wheels therefor, a coupling frame, a finger bar, and a stub tongue rigidly connected with the main frame, of ground engaging means disposed under and supporting the forward portion of said stub tongue, a transversely-disposed draft bar pivotally supported by said stub tongue at the opposite side thereof from said finger bar in a plane above the horizontal plane of said stub tongue to move longitudinally of the mower under the influence of the draft power, and means operatively connecting said draft bar with the main and coupling frames at separated points between said ground-engaging means and said supporting wheels for distributing the draft between said frames.

2. The combination with a mower comprising a main frame, supporting wheels therefor, a coupling frame, a finger bar, and a stub tongue rigidly connected with the main frame, of a tongue truck disposed under the forward portion of said stub tongue and pivotally connected therewith, a transversely-disposed draft bar pivotally supported by said stub tongue at the opposite side thereof from said finger bar to move longitudinally of the mower under the influence of the draft power, and means operatively connecting said draft bar with the main and coupling frames at separated points between said tongue truck and said supporting wheels for distributing the draft between said frames.

3. The combination with a mower comprising a main frame, supporting wheels therefor, a coupling frame, a finger bar, and a stub tongue rigidly connected with the main frame, of a tongue truck disposed under the forward portion of said stub tongue and pivotally connected therewith, a transversely disposed draft bar pivotally supported by said stub tongue at the opposite side thereof from said finger bar to move longitudinally of the mower, a distributor bar pivotally mounted between its ends on the stub tongue back of said tongue truck and forward of said supporting wheels, means connecting the distributor bar at the finger bar side of the stub tongue with said coupling frame, and means connecting said distributor bar at the opposite side of the stub tongue with said draft bar.

ROBERT C. LIVESAY.